W. M. STEELE.
ANTISLIPPING DEVICE FOR VEHICLE WHEELS.
APPLICATION FILED FEB. 8, 1915.
1,266,076. Patented May 14, 1918.
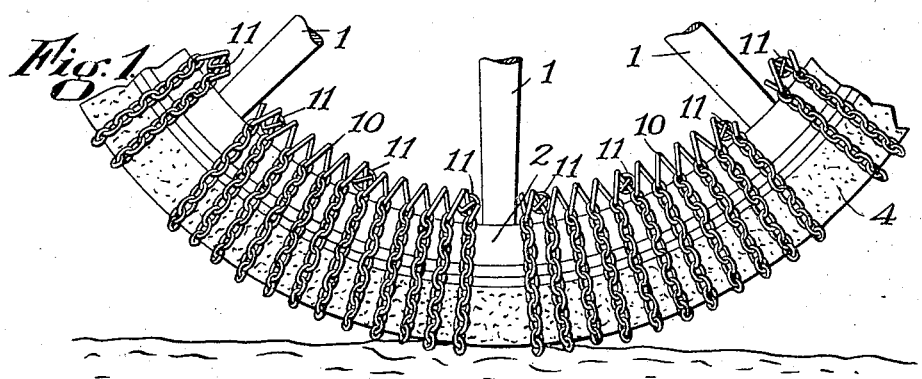
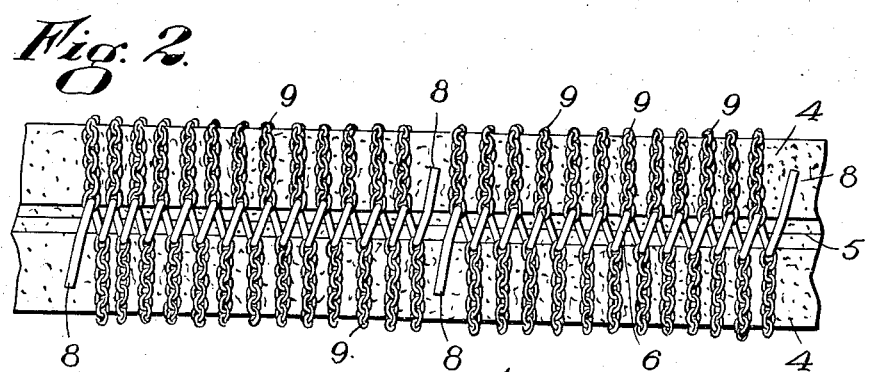
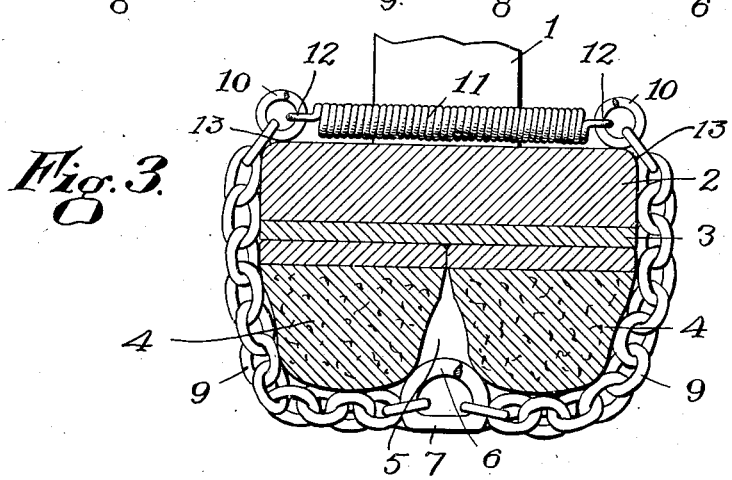

UNITED STATES PATENT OFFICE.

WILLIAM M. STEELE, OF WORCESTER, MASSACHUSETTS.

ANTISLIPPING DEVICE FOR VEHICLE-WHEELS.

1,266,076.　　　　Specification of Letters Patent.　　Patented May 14, 1918.

Application filed February 8, 1915. Serial No. 6,839.

*To all whom it may concern:*

Be it known that I, WILLIAM M. STEELE, a citizen of the United States, residing at Worcester, in the county of Worcester and Commonwealth of Massachusetts, have invented a new and useful Improvement in Antislipping Devices for Vehicle-Wheels, of which the following, together with the accompanying drawings, is a specification.
The present invention relates to devices for use upon vehicle wheels to prevent skidding of the wheels, and, in general, to secure traction between the wheels and the road. More particularly the devices are intended for use upon the heavier rubber tired vehicles, such as motor trucks, which employ the well known dual tread type of tires; and the object is to provide traction devices of simple and inexpensive construction, the parts of which may be easily replaced when worn out, and also, devices in which the parts in contact with the tire surface will not have a tendency to cut or damage the same.
The details of construction of the devices embodying my invention are fully set forth in the following description, reference being had to the accompanying drawings, in which—
Figure 1 is a fragmentary side elevation of a vehicle wheel, showing the application of my invention thereto.

Fig. 2 is a bottom plan view of the parts shown in Fig. 1, and Fig. 3 is an enlarged cross section through the rim of a wheel, showing the relation of the parts in their assemblage on said wheel.

Similar reference characters refer to similar parts in the different figures.
Referring to the drawings, the wheel shown is of ordinary construction, comprising spokes 1 secured in the felly 2, which carries a rim 3, providing for the attachment of the two solid rubber tread portions 4, 4 of the dual tread tire. My invention contemplates the use of series of traction devices, such as sections of chain, arranged to lie transverse to the direction of movement of the wheel, so as to afford the most efficient traction agency between the wheel and the road, and the said invention resides primarily in the novel means employed for coöperation with said traction devices to increase such traction, and in the means employed for securing and retaining such devices upon the wheel in a manner calculated to prevent undue wear upon the tire surfaces.

In the form of invention shown in the drawings the anti-slipping devices are applied in sectional form, each section corresponding in length, approximately, to the peripheral distance measured on the wheel felly 2, between adjacent spokes 1, 1. Each section comprises one or more supplementary traction devices adapted to lie within and be retained in position by the recess 5 between the opposing faces of the tread portions 4, 4 of the dual tread tire. In the present instance I have shown such supplementary traction devices in the form of a single stout coil spring 6, having its convolutions preferably flattened on one side, as shown at 7, Fig. 3, which side is positioned for contact with the road surface. The ends 8 of said spring 6 are extended transversely of the wheel in opposite directions, one resting upon each tread portion to assist in retaining the spring in position within the recess. The said springs, or their equivalents, serve as the attaching means for the transversely extending devices by which the greater portion of the tractive effect is secured, said devices in the present instance being constituted by a series of chains 9 which are attached to the central member or members 6 on each side thereof, and are extended over the faces and outer sides of the adjacent tread portions 4, 4, as shown in the drawings.

The chains 9 have their end links strung upon alternating convolutions of the spring 6 on each side of the flattened portion 7 thereof, and said chains at their other ends are attached to the inner securing members of the corresponding section, which members, in the present instance, are shown as a pair of coil springs 10, disposed upon the inner periphery of the felly 2 adjacent each edge thereof and extending between the spokes 1. The two springs 10 of each section are connected together by compression springs 11, extending crosswise of the inner surface of said felly and serving to draw the springs 10 toward the center thereof, thereby holding the chains 9 tight against the faces and outer sides of the tread portions 4. I have shown three such springs 11 for each section, one near the longitudinal center and one at each end of the springs 10, but it will be clear that any number of the same may be employed. The springs 11 have hook portions 12 at their ends to enable convenient attachment to the convolutions of the springs 10 when the devices are being assembled upon the wheel.

By the construction above described, the entire tractive surface of the wheel is substantially covered by a protective or armored casing, applied in sections, which sections are anchored against peripheral creeping by their disposition between the spokes of the wheel. The traction afforded by the transverse arrangement of the chains 9 is augmented by reason of the retention of the traction devices in a substantially fixed position under the normal conditions of travel of the wheel, and also by reason of the constant tension exerted by the springs 11 to hold the chains in close contact with the tread of the wheel. Moreover, it will be seen that the close arrangement of chains 9 distributes the weight upon the wheel, at any given instant, over a relatively extended surface of the tread, whereby the tendency of such chains to cut into the tread is materially reduced, in comparison to chains which are spaced apart upon the wheel and come into contact with the road at different times. In addition, the provision of yielding means, in the form of the longitudinal springs 10, permits individual transverse traction devices to yield, when encountering an obstruction in the road, without affecting the tightness of the other traction devices of the same section, while the transverse springs 11 enable the section as a whole to yield when necessary.

The convolutions of the springs 6 afford a tractive effect supplementing that afforded by the cross chains 9, it being apparent that the said springs are maintained in position in the recess 5 by the exertion of substantially balanced forces upon opposite sides thereof, thereby presenting at all times their flattened sides 7 to the roadway. It is to be understood, however, that chain attaching means, other than the springs 6, to be thus anchored in said recess, are within the contemplation of my invention, and, furthermore, that such invention is not to be limited to the precise means shown and described for securing the improved results above mentioned, except as specified in the annexed claim.

It is to be noted further, that certain novel features of my invention are attainable without the use of the peripherally disposed coil springs 10, it being obvious that the chains 9 might be connected directly to the hook portions 12 of the compression springs 11, one of the latter being provided for each pair of chains 9. With this arrangement, as in the present arrangement, creeping of the traction devices is positively prevented by the disposition of the resilient attaching devices between the spokes of the wheel; furthermore, the exertion of a tension on the chains by the springs 11, in a direction at right angles to the side walls of the tread, causes the chains to bind upon the edges or corners 13, 13 of the felly 2, thereby increasing the frictional resistance against any tendency to creep.

I claim,

Devices of the character described, comprising a plurality of traction members extending transversely of the tire, a plurality of independent unconnected coiled springs arranged peripherally of the tire on each side thereof, to which the ends of said traction members are attached, and a plurality of yieldable devices disposed transversely of the rim of said tire and connecting said oppositely disposed coiled springs at a plurality of points.

WILLIAM M. STEELE.

Witnesses:
 PENELOPE COMBERBACH,
 NELLIE WHALEN.